United States Patent [19]
Glynn et al.

[11] Patent Number: 5,281,098
[45] Date of Patent: Jan. 25, 1994

[54] SINGLE RING BLADE RETAINING ASSEMBLY

[75] Inventors: Christopher C. Glynn, Hamilton; Rolf R. Hetico, Cincinnati, both of Ohio

[73] Assignee: General Electric Company, Cincinnati, Ohio

[21] Appl. No.: 967,890

[22] Filed: Oct. 28, 1992

[51] Int. Cl.⁵ .............................. F01D 5/32
[52] U.S. Cl. ...................... 416/221; 416/220 R
[58] Field of Search .............. 416/219 R, 220 R, 221

[56] References Cited

U.S. PATENT DOCUMENTS

| | | |
|---|---|---|
| 2,755,062 | 7/1956 | Hill . |
| 2,755,063 | 7/1956 | Wilkinson ............ 416/220 R |
| 3,043,562 | 7/1962 | Van Nest et al. . |
| 3,047,268 | 7/1962 | Leavitt . |
| 3,096,074 | 7/1963 | Pratt et al. . |
| 3,644,058 | 2/1972 | Barnabei et al. ............ 416/219 R |
| 3,653,781 | 4/1972 | Cooper . |
| 3,768,924 | 10/1973 | Corsmeier et al. . |
| 3,807,898 | 4/1974 | Guy et al. ............ 416/221 |
| 4,033,705 | 7/1977 | Luebering . |
| 4,108,571 | 8/1978 | Mawson ............ 416/221 |
| 4,171,930 | 10/1979 | Brisken et al. . |
| 4,221,542 | 9/1980 | Acres et al. . |
| 4,304,523 | 12/1981 | Corsmeier et al. . |
| 4,349,318 | 9/1982 | Libertini et al. . |
| 4,432,555 | 2/1984 | Langley . |
| 4,457,668 | 7/1984 | Hallinger . |
| 4,470,756 | 9/1984 | Rigo et al. . |
| 4,480,958 | 11/1984 | Schlechtweg . |
| 4,566,857 | 1/1986 | Brumen . |
| 4,669,959 | 6/1987 | Kalogeros . |
| 4,890,981 | 1/1990 | Corsmeier et al. . |
| 4,898,514 | 2/1990 | McCracken . |
| 4,940,389 | 7/1990 | Luxenburger . |
| 5,015,150 | 5/1991 | Rohra . |
| 5,018,941 | 5/1991 | Heurtel et al. . |

Primary Examiner—Edward K. Look
Assistant Examiner—Christopher M. Verdier
Attorney, Agent, or Firm—Jerome C. Squillaro

[57] ABSTRACT

The present invention provides an axial blade to disk retaining assembly having a plurality of circumferentially disposed lugs arranged in a ring around an axial facing surface of the blade and disk assembly and a plurality of circumferentially disposed hooks arranged in a ring around the axial facing surface and in circumferential alternating positions with the hooks and radially spaced apart from and open towards the lugs. A split retaining ring is provided that is operable to be placed between said hooks and lugs to axially secure the blades on the disk. In the preferred embodiment each hook is disposed on a disk post between the blades and each lug is disposed on a blade root.

11 Claims, 3 Drawing Sheets

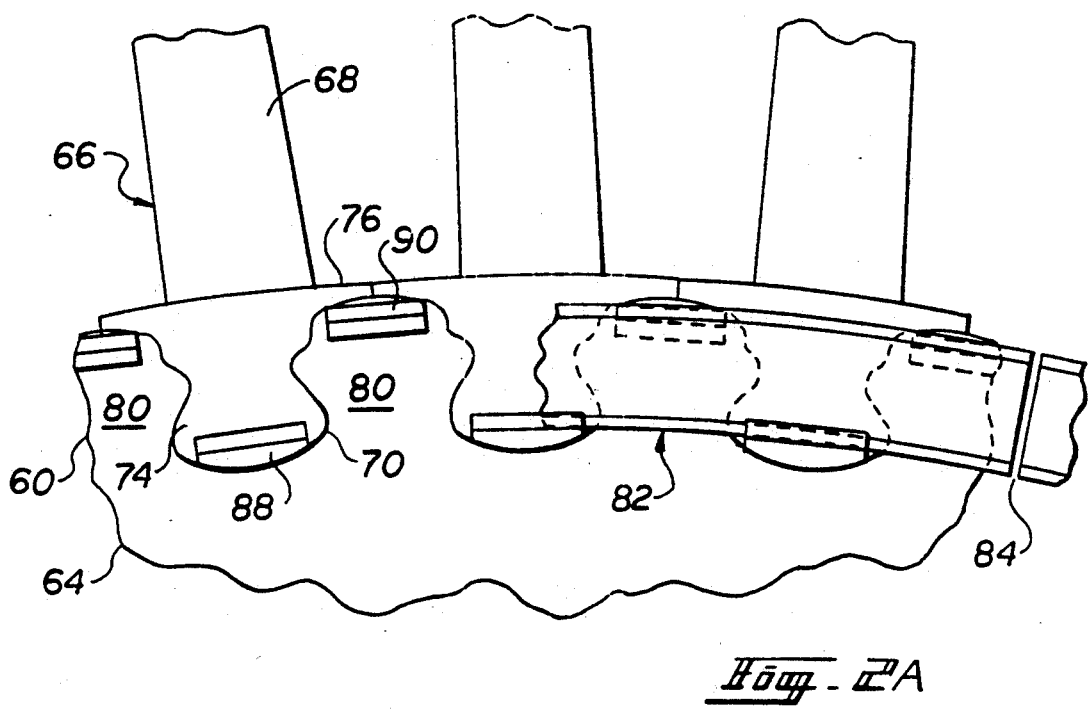
_Fig. 2A_
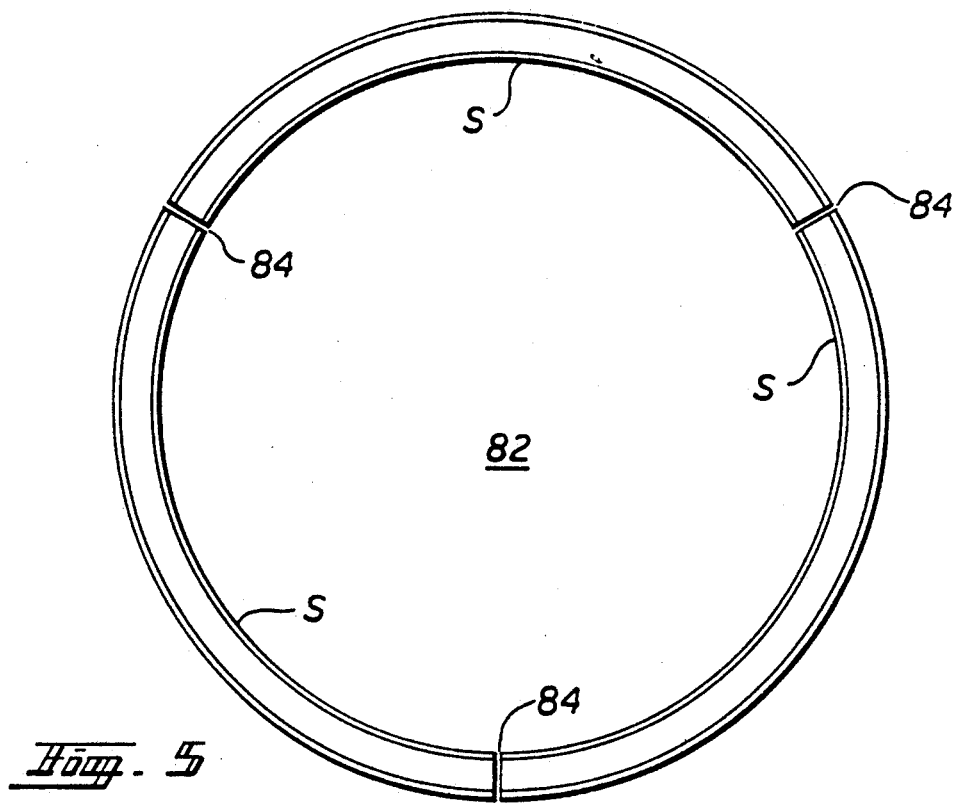
_Fig. 5_

SINGLE RING BLADE RETAINING ASSEMBLY

BACKGROUND OF THE INVENTION

1. Field of the Invention

This invention relates to blade to disk blade retention in turbomachinery and, more particularly, to boltless blade retainers particularly useful for turbines.

2. Description of Related Art

Turbomachinery blades are typically mounted by their dovetail roots into correspondingly contoured dovetail slots for radial retention during engine operation. Axial restraint within these slots have been in the past by bolts and presently by boltless assemblies using single piece split retaining rings which engage radially inward opened hooks disposed on the disk posts between the blade roots. Conventional split retaining rings are made of a spring metallic material so that the ring can be closed with a tool to provide a smaller diameter that allows it to be aligned radially inward of the hook openings and then be released to spring radially outward into the slots of the hooks thereby axially restraining the blades. Such assemblies, though used on fan and compressor blades, are not known, by the inventors, to be used in the low pressure turbine section for which the present invention was designed but not limited to.

The problem with applying such a retainer to the turbine section of an engine is that the operating temperature of the turbine blades and disk varies greatly over the engine operational envelope and the heating and cooling cycles can cause the ring to relax and fall out of contact with some or all the hooks and perhaps even disengage itself fully from its retaining position. Therefore, conventional low pressure turbine blade axial restraint is provided by many complicated multi-element types of assemblies including bolts, multiple interlocking retaining rings, and clips having bendable tabs. One such assembly having a clip with a bendable tab is shown in U.S. Pat. No. 3,653,781 entitled "Turbomachinery Blade Retainer", by James Lee Cooper, issued on Dec. 18, 1972, and assigned to the present assignee. All of these systems are characterized by complicated assemblies and assembly procedures and multiple parts that often reduce the strength of the disk and blade retainer such as in the case of bolted assemblies.

The present invention was developed to provide advantages of low weight, uncomplicated, and highly reliable single piece retaining rings and alternatively retaining rings with a very small number of pieces for use in LPT turbine blade to disk axial restraining assemblies.

SUMMARY OF THE INVENTION

The present invention provides an axial blade to disk retaining assembly having a plurality of circumferentially disposed lugs arranged in a ring around an axial facing surface of the blade and disk assembly and a plurality of circumferentially disposed hooks arranged in a ring around the axial facing surface and circumferentially offset from the lugs and preferably in circumferential alternating positions with the lugs and radially spaced apart from and open towards the lugs. A split retaining ring is provided that is operable to be placed between said hooks and lugs to axially secure the blades on the disk. The retaining ring may be split in one or more places. A single split one piece ring and a triple split ring having three 120 degree sectors are particularly useful.

The preferred embodiment has the hooks arranged in an outer annular ring having each hook disposed on a disk post between the blades and the lugs arranged in an inner annular ring having each lug disposed on a corresponding blade root. The preferred embodiment provides a split retaining ring having an outer annular body which provides the blade retaining function connected to a thinner inner annular rim which provides a handle for the installer to grip the retaining ring when bending the retaining ring to insert and remove it during assembly and disassembly.

ADVANTAGES

The present invention provides an uncomplicated and highly reliable single piece retaining ring assembly particularly suitable for use in LPT turbine blade to disk axial restraining assemblies. The present invention provides a light weight and lower cost design for axially retaining rotor blades, particularly for LPT turbine assemblies and modules. It has the advantage of using far less parts during assembly and is therefore easier and cheaper to produce than previous designs. The present invention is also more reliable than previously designed ring retainer assemblies because it will retain the ring if it fails and not allow it to fall into other sections of the engine posing a possible hazard. By eliminating the use of tabs the installation and disassembly time is significantly reduced.

BRIEF DESCRIPTION OF THE DRAWINGS

The foregoing aspects and other features of the invention are explained in the following description, taken in connection with the accompanying drawings where:

FIG. 2A is an axially facing view of a portion of a turbine disk and blade assembly including a blade retaining means in accordance with an alternate embodiment of the present invention.

FIG. 5 illustrates an alternate embodiment of a retaining having three sectors for use in a blade retaining means in accordance with the present invention.

DETAILED DESCRIPTION OF THE INVENTION

Figure 1:
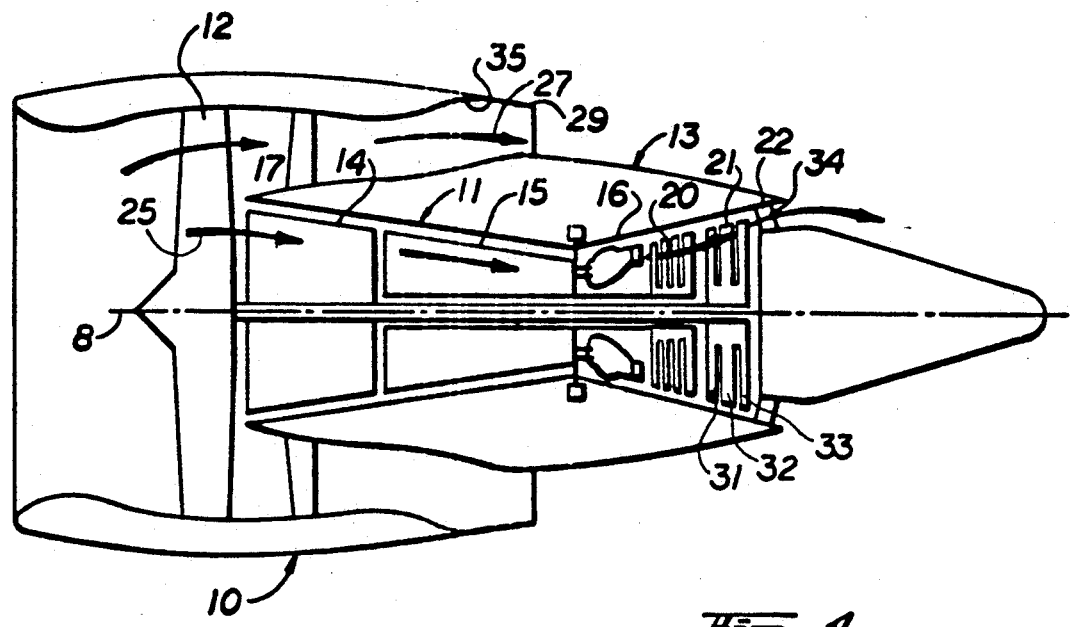
FIG. 1 is a cross-sectional view of a turbofan gas turbine engine illustrating a turbine disk and blade assembly in accordance with the present invention.

The gas turbine engine of FIG. 1 represents a conventional aircraft gas turbine engine having a low pressure turbine module including a turbine blade to disk axial retaining assembly in accordance with the preferred embodiment of the present invention.

Referring to FIG. 1, a typical gas turbine engine 10 is shown comprising a fan section 12 which is in serial flow relationship with an engine core 13 and with a by-pass duct 35 which is generally disposed, in concentric fashion, about the engine core 13. Flow from engine core 13 and by-pass duct 35 is discharged to an exhaust section 22 having a fan nozzle 29 used to help produce thrust. A splitter 17 by-passes a portion of the airflow, referred to as by-pass flow 27, from fan section 12 through by-pass duct 35 around engine core 13 and out the fan nozzle 29 to produce thrust. The remaining airflow, referred to as core airflow 25, is compressed in the compressor section 11 first by low pressure compressor 14 and then high pressure compressor 15 and the compressed core airflow 25 is then discharged to a combustion section 16.

The combustion section 16 produces hot combustion gases which are mixed with the remainder of the compressor discharge flow and the resultant heated effluent is then flowed to a high pressure turbine section 20 (HPT) which powers high pressure compressor 15 and to a low pressure turbine section 21 (LPT) which powers low pressure compressor 14 and fan section 12 and finally exhausted through the core engine nozzle 34. Modern engines often constructed in a modular fashion employing subassemblies referred to as modules such as an HPT module and an LPT module as in the preferred embodiment of the present invention. The LPT module of the present invention is illustrated as a three stage LPT having first, second, and third stage rotor disks 31, 32, and 33 respectively. The first disk 31 and the third disk 33 incorporate the blade to disk retaining means of the present invention.

Figure 2:
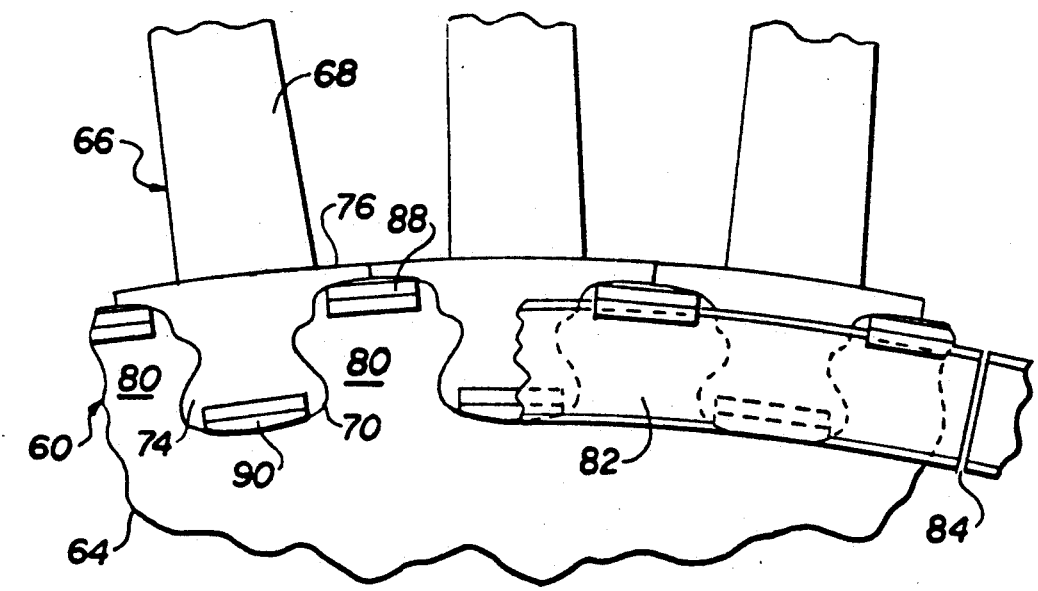
FIG. 2 is an axially facing view of a portion of a turbine disk and blade assembly including a blade retaining means in accordance with the present invention.

Illustrated in FIG. 2 is an axial view along centerline 8 of a turbine blade to disk axial retaining assembly 60 on an LPT disk 64 in the low pressure turbine section 21 in FIG. 1. Turbine blades 66, having airfoils 68 mounted radially outward of and to blade platforms 76, are mounted and radially secured to the LPT disk 64 by blade roots 70. The blade roots 70 are circumferentially disposed in axially extending disk slots 74 between circumferentially disposed disk posts 80. The shape of the slots 74 and the roots 70 are illustrated as dovetails and are commonly referred to as dovetail slots and dovetail roots. The turbine blade to disk axial retaining assembly 60 may be used on the forward or aft facing surfaces of the LPT disk 64 and is preferably used on the forward facing surface of the first disk 31 and the aft facing surface of the third disk 33 in FIG. 1.

Figure 3:
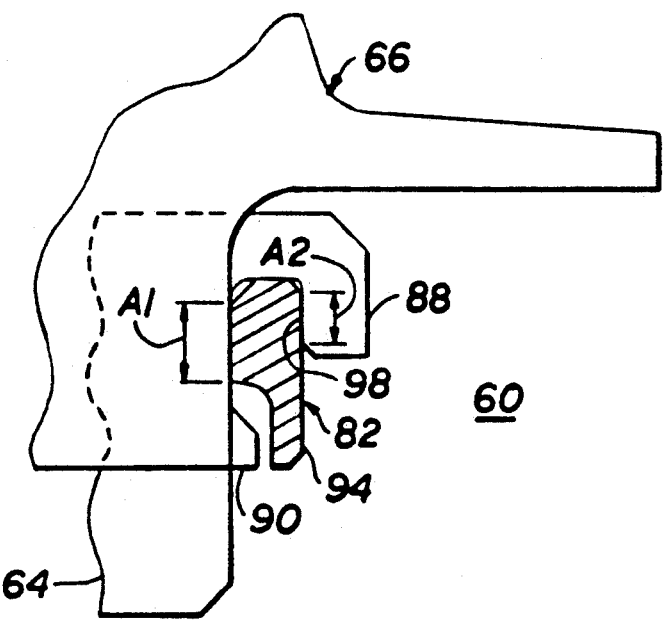
FIG. 3 is a side sectional view of the turbine disk and blade assembly illustrated in FIG. 2.

Referring to FIGS. 2 and 3, the turbine blade to disk axial retaining assembly 60 includes a ring of hooks 88 which are circumferentially disposed on the disk posts 80 and a ring of lugs 90 which are circumferentially disposed on the blade roots 70 and the rings are radially spaced apart from each other. The hooks 88 have openings 98 which open towards the lugs 90 and are radially spaced sufficiently apart to accept a split retaining ring 82 which includes a split 84. A single split retaining ring is illustrated in the FIGS. but a multiple split ring forming two or more sectors may also be used. For example, a triple split retaining ring 82 having three sectors S and three splits 84, as illustrated in FIG. 5, has been found to be advantageous for a 36 inch diameter retaining ring.

Figure 4:
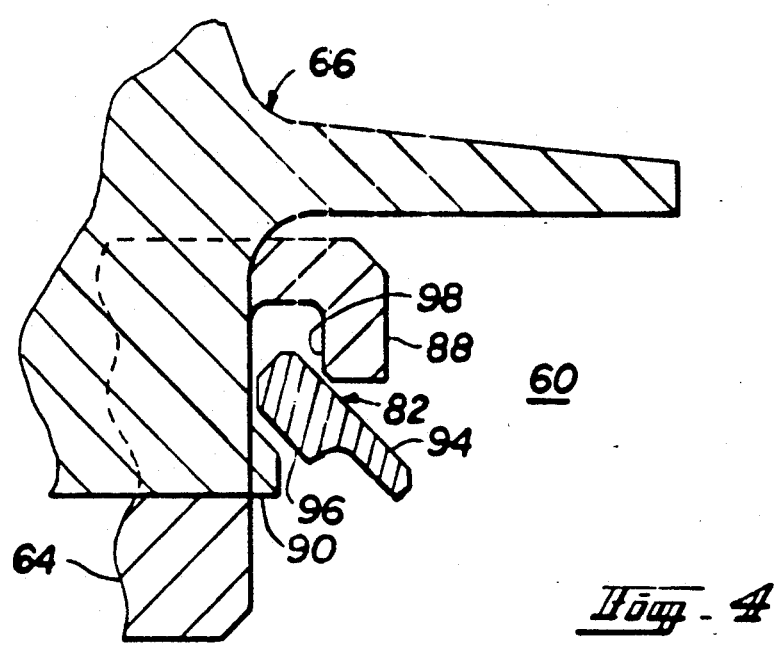
FIG. 4 illustrates the installation of a retaining ring in the turbine disk and blade assembly illustrated in FIG. 3.

Referring to FIG. 4, the split 84 together with a degree of springiness in the retaining ring 82 provide a means to temporarily deform and slightly twist the retaining ring or bend it in the axial direction so as to slide it past the lugs 90 into the hook openings 98 section by section circumferentially around the disk 64, thereby securing all blades 66 axially in place. The preferred embodiment of the split retaining ring 82 includes an outer annular body 96 which provides the blade retaining function connected to a thinner inner annular rim 94 which provides a handle for the installer to grip the retaining ring 82 when bending the retaining ring to insert and remove it during assembly and disassembly. The annular body 96 has a disk contact surface generally indicated at A1 and a hook contact surface generally indicated at A2 which preferably engage corresponding portions of the disk and blade assembly and the hooks respectively when the retaining ring is installed. An alternative embodiment uses a local tab having the same general cross section as the thinner inner annular rim 94 shown in FIGS. 3 and 4 which can also provide a handle for the installer to grip the retaining ring 82 during assembly and disassembly.

The blade to disk axial retaining assembly 60 may be used with other rotors and blade assemblies such as in the compressor or fan sections of the engine. The blade to disk axial retaining assembly 60 may also be used on forward or aft facing surfaces of the disk 64. Also contemplated by the present invention is having the lugs 90 and hooks 80 in reverse positions both circumferentially, with the hooks 88 on the blade roots 70 and the lugs 90 on the posts 80 and radially with the lugs 90 disposed radially outward of the hooks 88 as illustrated in FIG. 2A. Another embodiment of the present invention provides that both the lugs and the hooks be placed on the disk and yet another embodiment provides that both the lugs and hooks be placed on the blades.

While the preferred embodiment of our invention has been described fully in order to explain its principles, it is understood that various modifications or alterations may be made to the preferred embodiment without departing from the scope of the invention as set forth in the appended claims.

We claim:

1. An axial blade retaining apparatus for a rotor blade and disk assembly having a plurality of blades comprising:
    a plurality of circumferentially disposed lugs,
    a plurality of circumferentially disposed hooks that are radially spaced apart from and open towards said lugs,
    said plurality of circumferentially disposed lugs and said plurality of circumferentially disposed hooks mounted on an axially facing surface of said rotor blade and disk assembly wherein said lugs are circumferentially offset from said hooks, and
    a springy split retaining ring operably disposed between said hooks and lugs whereby said blades are axially retained by said retaining ring.

2. An axial blade retaining apparatus as claimed in claim 1 further comprising;
    a plurality of axially facing blade root surface having a first plurality of first axial restraining elements chosen from a group of axial restraining elements, said group comprising said plurality of circumferentially disposed lugs and said plurality of circumferentially disposed hooks mounted thereupon, and
    a plurality of axially facing disk post surfaces having a second plurality of second axial restraining elements chosen from said group and different from said first plurality of first axial retaining elements mounted thereupon.

3. An axial blade retaining apparatus as claimed in claim 2 wherein each one of said plurality of axially facing blade root surfaces has mounted upon it one of said plurality of circumferentially disposed lugs and each one of said plurality of axially facing disk post surfaces has mounted upon it one of said plurality of circumferentially disposed hooks.

4. An axial blade retaining apparatus as claimed in claim 3 wherein said plurality of circumferentially disposed lugs are arranged in an inner generally annular ring and said plurality of circumferentially disposed hooks are arranged in an outer generally annular ring.

5. An axial blade retaining apparatus as claimed in claim 1 wherein said split retaining ring comprises an annular body which provides the blade retaining function and axially extends between said axially facing surface of said rotor blade and disk assembly and said hook and is connected to a thinner inner annular rim which provides a handle for an installer to grip the retaining ring during assembly and disassembly.

6. An axial blade retaining apparatus as claimed in claim 5 wherein said rotor blade and disk assembly is a low pressure turbine rotor blade and disk assembly.

7. An axial blade retaining apparatus as claimed in claim 5 further wherein said split retaining ring simultaneously contacts said axially facing surface of said rotor blade and disk assembly and said hooks when said retaining ring is installed.

8. An axial blade retaining apparatus as claimed in claim 1 wherein said split retaining ring further comprises more than one sector.

9. An axial blade retaining apparatus as claimed in claim 1 wherein said split retaining ring further comprises three sectors.

10. A turbomachinery rotor disk assembly comprising:
   a rotor disk,
   a plurality of rotor blades circumferentially disposed along the rim of said disk,
   said blades having roots disposed in corresponding axially extending slots between disk posts in said disk, and an axial blade retaining assembly comprising:
   a first ring of circumferentially disposed lugs,
   a second ring of circumferentially disposed hooks that are radially spaced apart from and open towards said lugs,
   a plurality of axially facing blade root surfaces on said blade roots, said axially facing blade root surfaces having a first plurality of first axial restraining elements, chosen from a group of axial restraining elements, said group comprising said ring of circumferentially disposed lugs and said ring of circumferentially disposed hooks mounted thereupon,
   a plurality of axially facing disk post surfaces on said disk posts, said axially facing disk post surfaces having a second plurality of second axial restraining elements chosen from said group and different from said first plurality of first axial restraining elements mounted thereupon, and
   a springy split retaining ring operably disposed between said hooks and lugs.

11. A turbomachinery rotor disk assembly as claimed in claim 8 wherein said ring of circumferentially disposed lugs is disposed in a one to one correspondence, between said lugs and said blade roots, upon said plurality of axially facing blade root surfaces and said ring of circumferentially disposed hooks is disposed, in a one to one correspondence between said hooks and disk posts, upon said plurality of axially facing disk post surfaces.

* * * * *